Jan. 5, 1926.
G. A. RIGGS
1,568,623
PHOTOGRAPHIC CAMERA
Filed Oct. 17, 1921
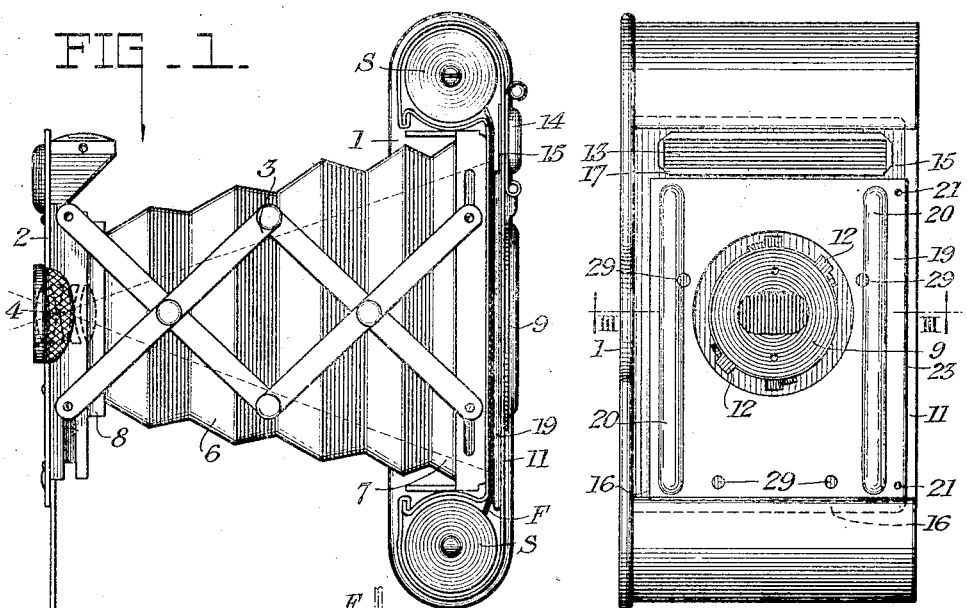
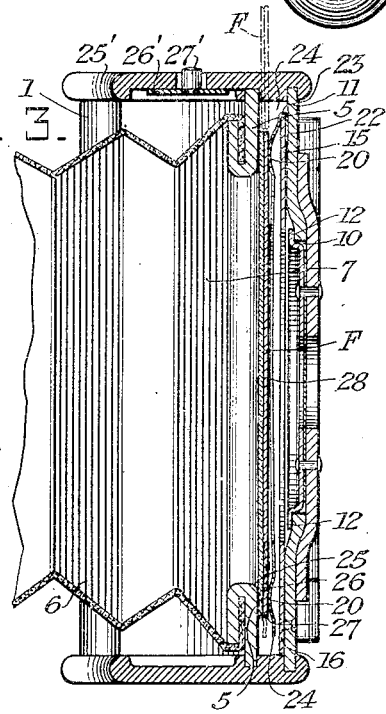
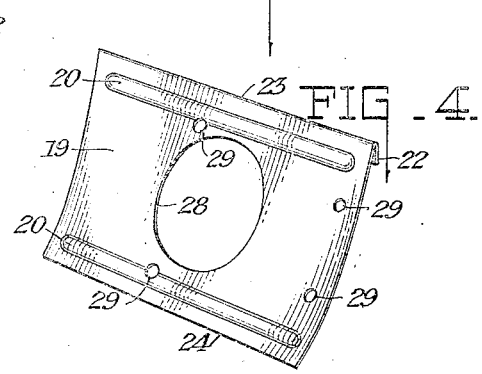
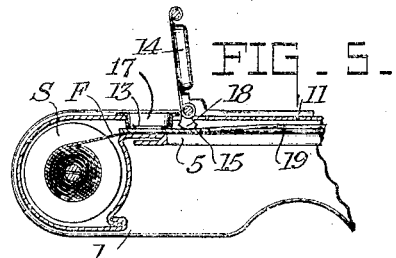
WITNESS
INVENTOR
Gershom A. Riggs,
BY
ATTORNEYS.

Patented Jan. 5, 1926.

1,568,623

UNITED STATES PATENT OFFICE.

GARSHOM A. RIGGS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

Application filed October 17, 1921. Serial No. 508,212.

*To all whom it may concern:*

Be it known that I, GARSHOM A. RIGGS, a citizen of the United States of America, residing at Rochester, in the county of Monroe and State of New York, have invented certain new and useful Improvements in Photographic Cameras, of which the following is a full, clear, and exact specification.

This invention relates to photography and more particularly to a photographic camera, and has for its object to provide a simple, cheap and efficient means for holding the film in the focal plane of the camera lens. To these and other ends the improvements are directed particularly to means for holding the film flat without obstructing the loading of the film into the camera; to means for constructing such a device which will press the longitudinal edges of the film against a frame; to means for mounting the film pressing device in the camera so as to co-operate with the film clamp used in connection with the film tilting mechanism; to means for pressing the film flat which will permit of focusing the objective in assembly; to means for pressing the film flat which will lend itself to efficient production, and to means for equipping old cameras with such a spring. With these and other objects in view, the invention consists in certain novel arrangements and combinations of parts such as will be fully hereinafter described, the novel features being pointed out in the claims at the end of the specification.

In the drawings, in which like reference characters denote like parts throughout,—

Fig. 1 is a side elevation of a well known type of camera, with one side removed, constructed in accordance with and illustrating one embodiment of my invention;

Fig. 2 is a front elevation of a part of the camera shown in Fig. 1;

Fig. 3 is an enlarged fragmentary section on line III—III of Fig. 2, but including parts not shown in Fig. 2;

Fig. 4 is a perspective of the film spring removed from the camera; and

Fig. 5 is a section through a portion of a camera illustrating certain features of my invention.

I will first describe such parts of the camera as are necessary for understanding my invention. The camera body 1 supports a lens board 2 by means of lazy tongs 3, there being an objective 4 carried by a shutter casing (not shown) which is mounted in the lens board. Spools S form a means for taking up and supplying the film band F, which is drawn across the bellows frame. When I refer to film band in this specification, I am referring to the film and backing paper or to the film backing paper and carbon paper, as is provided for film used in a camera of this type. A bellows 6 is held at one end 7 by the frame 5 and at the other end by a frame 8 affixed to the lens board 2. A removable circular door 9 is attached over the window 10 of the camera back 11 by a bayonet lock 12—12, this opening being used in the initial focusing of the objective in assembling, and later for cleaning the rear surface of the lenses of the objective. The construction is well known, being shown in U. S. Patent No. 1,107,358, Robertson and Kroedel, Aug. 18, 1914. Just above this opening there is a long narrow slot 13, covered normally by a hinged door 14. A plate 15 fastened to camera back 11 along the edge 16—16 only forms a spring upon which a frame 17 is mounted, being moved to lock the film band against the bellows frame 5 by a cam 18 operated by opening the door 14. This construction is likewise old, being of the type shown in U. S. Patent No. 1,251,105, Riddell, Dec. 25, 1917.

Coming now to my invention, a spring plate 19 having formed up ribs 20 is fastened in the camera back 11 preferably by a "pimple and a dimple" connection 21—21 to plate 15, formed by indenting the metal by means of a pointed instrument after plate 19 is positioned on plate 15. This connection is shown in Fig. 2, where the bellows frame 5, together with other parts of the camera, have been removed. Fig. 4 shows the spring plate 19 before being assembled. A flange 22 is bent along the upper edge 23 leaving a smooth, thin, rounded edge, which will not obstruct the film passage 24' (Fig. 3) which is the opening between the back wall 11 and the front wall or face 5 of the bellows frame. In the present camera the focal plane of the lens corresponds to the exposed side of the bellows frame, so that the bellows frame 5 also forms an exposure frame against which the film band is held. The side wall 25' is removed for loading the camera, being held in place by a locking bar 26' actuated by a button 27' of well known construction. When the camera is being loaded, the film band F can be readily entered, as is shown in fine dotted and dashed lines, Fig. 3. As is also shown in this view, the edges 28 of the film are pressed against the longitudinal edges of the exposure frame 5 holding the film in the focal plane, which corresponds to the plane of the bellows frame against which the film lies. The rounded ribs 20 present a smooth surface to the film band, and if offset or friction marks should occur due to this pressure, the markings will be outside of the picture area.

As the tension on ribs 20 is derived from the spring in the metal plate 19, acting from the fold 23, it will be noted that there is a tendency for the bottom 24 of the plate to swing until rib 20 contacts with the bellows frame when the camera is not loaded (dashed lines Fig. 3). Attention is also called to the fact that the rounded edge 25 of bellows frame 5 together with a rounded side 26 of rib 20 together form a guideway for the lower edge 27 of the film band. This greatly facilitates loading.

In order to properly focus the objective 4 when the camera is assembled, and in order to clean the lenses of the objective, the spring plate 19 has a large central aperture 28 to correspond to the window 10 of the camera back. Small apertures 29 are to permit the assembling of certain rivets or screws used in the construction of the camera.

A film pressing device constructed as above described not only adds very little cost to a new camera in both manufacture and construction, but can also be applied readily to cameras on the market. I contemplate providing the spring plate 19, as shown in Fig. 4, as a separate part. This can be attached to a camera by merely springing out the upper end of plate 15 (as it is fastened only at end 16—16 to the back 11) and inserting flange 22 beneath it. The spring tension of plate 15 will hold satisfactorily but I prefer to use a sharp punch and connect the parts by a "pimple and dimple" as hereinbefore described.

Having thus described my invention, what I claim as new and desire to secure by Letters Patent is:

1. In a camera, the combination with an exposure frame, of a spring mounted in the camera for constantly maintaining a yielding pressure toward the exposure frame, said spring being attached to the camera along one edge only, the film being loaded into the camera against the pressure of the spring.

2. In a camera, a film positioning plate having film pressing ribs formed thereupon adapted to hold a film flat.

3. In a camera, a film positioning plate having film pressing ribs formed thereupon adapted to hold a film flat, and a flange on the plate, said flange being attached to the camera.

4. In a camera, a film pressing plate having ribs thereon for pressing the film flat against a part of the camera, said ribs presenting a smooth surface to the edge of a film being loaded into the camera.

5. In a camera, a film pressing plate having a rib carried by the plate for holding a film flat by pressing along the edge thereof, a surface of the rib being shaped to assist in guiding a film into position when loading the camera.

6. In a camera, the combination with a film clamping plate, a hinged door for actuating the clamping plate, and a film pressing spring carried by the first mentioned plate, the clamping plate holding the film when the door is open, and the spring constantly exerting a pressure upon the film to hold it flat, irrespective of the position of the clamping plate.

7. In a camera, the combination with a movable plate attached to the camera back, of a spring for holding the film flat in the camera, a flange on said spring extending around the edge of the plate.

8. In a camera, the combination with a camera back wall, and an exposure frame, of a spring for holding a film flat in the opening between the wall and frame, a removable end wall permitting a film to be loaded edgewise into the opening between the back wall and frame, the spring presenting a smooth continuous surface to an edge of a film being inserted into the camera and guiding the film into a position in which it will be held flat against the exposure frame by the spring.

9. In a camera, the combination with a camera back wall, and an exposure frame, of a spring between the back wall and the frame adapted to hold a film flat against the frame, a removable end wall to the camera permitting a film to be loaded edgewise into the opening between the frame and back, a portion of the spring lying adjacent to a side of the opening so as to leave a free passage for the film.

10. In a camera, the combination with a camera back wall, and an exposure frame having an opening therein, of a spring of greater width than the opening in the exposure frame in the space between the above mentioned parts adapted to hold a film flat against the frame, said spring consisting of a thin metallic metal plate touching the back wall of the camera at one side only.

11. In a camera, the combination with a camera back wall, and an exposure frame, of a spring in the space between the above mentioned parts adapted to hold a film flat against the frame, said spring including a plate having ribs adapted to press the longitudinal edges of the film, the spring plate being supported in the camera by means of a portion of the plate on one side only, parallel to the ribs.

Signed at Rochester, New York, this 12th day of October, 1921.

GARSHOM A. RIGGS.